(12) United States Patent
Stooker et al.

(10) Patent No.: US 8,632,380 B2
(45) Date of Patent: Jan. 21, 2014

(54) METHOD AND APPARATUS FOR REMOVING A SLEEVE OF MEAT FROM AN ANIMAL PART HAVING BONE WITH KNUCKLES ON EACH OF ITS OPPOSITE ENDS

(75) Inventors: Dirk Cornelis Stooker, Puttershoek (NL); Jacobus Eliza Hazenbroek, Oud-Beijerland (NL); Gerrit Hendrik Woltman, Goudswaard (NL)

(73) Assignee: Foodmate B.V., Oud-Beijerland (NL)

( * ) Notice: Subject to any disclaimer, the term of this patent is extended or adjusted under 35 U.S.C. 154(b) by 310 days.

(21) Appl. No.: 13/012,260

(22) Filed: Jan. 24, 2011

(65) Prior Publication Data
US 2011/0183592 A1     Jul. 28, 2011

(30) Foreign Application Priority Data

Jan. 26, 2010  (NL) .................................... 2004149

(51) Int. Cl.
    *A22C 17/00*     (2006.01)
(52) U.S. Cl.
    USPC ......................................................... 452/136
(58) Field of Classification Search
    USPC .......................... 452/125, 127, 135, 136, 138
    See application file for complete search history.

(56) References Cited

U.S. PATENT DOCUMENTS

| 3,956,794 A | 5/1976 | Verbakel |
| 3,969,790 A | 7/1976 | Smorenburg |
| 3,979,793 A | 9/1976 | Hazenbroek |
| 3,983,601 A | 10/1976 | Verbakel |
| 3,990,128 A | 11/1976 | van Mil |
| 4,034,440 A | 7/1977 | van Mil |
| 4,118,829 A | 10/1978 | Harben, Jr. |
| 4,131,973 A | 1/1979 | Verbakel |
| 4,147,012 A | 4/1979 | van Mil |

(Continued)

FOREIGN PATENT DOCUMENTS

| EP | 0 439 784 A1 | 8/1991 |
| EP | 0 763 326 A1 | 3/1997 |

(Continued)

OTHER PUBLICATIONS

International Search Report—PCT/NL2011/050042.

(Continued)

*Primary Examiner* — Richard Price, Jr.
(74) *Attorney, Agent, or Firm* — Womble Carlyle Sandridge & Rice, LLP (57) ABSTRACT

A method of removing a sleeve of meat (D) from an animal part having a bone with a first knuckle (B) on one of two opposite ends of an elongate bone shaft (A) and a second knuckle (C) on another of the two opposite ends. The method includes the steps of engaging the bone of the animal part with a part of a meat stripper (13) between its first knuckle (B) and the sleeve of meat (D) and engaging the bone by a knuckle gripper (71) between the part of the meat stripper (13) and the first knuckle (B). The method continues with moving the meat stripper (13) and the knuckle gripper (71) away from one another, while stripping and gathering the sleeve of meat (D) towards the second knuckle (C). In a subsequent step the method discontinues moving away the meat stripper (13) and knuckle gripper (71) from one another upon the part of the meat stripper (13) engaging the second knuckle (C).

31 Claims, 6 Drawing Sheets

(56) References Cited

U.S. PATENT DOCUMENTS

| | | |
|---|---|---|
| 4,153,971 A | 5/1979 | Simonds |
| 4,153,972 A | 5/1979 | Harben et al. |
| 4,178,659 A | 12/1979 | Simonds |
| 4,203,178 A | 5/1980 | Hazenbroek |
| 4,283,813 A | 8/1981 | House |
| 4,292,709 A | 10/1981 | van Mil |
| 4,388,811 A | 6/1983 | Zebarth |
| 4,395,795 A | 8/1983 | Hazenbroek |
| 4,406,037 A | 9/1983 | Hazenbroek |
| 4,418,444 A | 12/1983 | Meyn et al. |
| 4,418,445 A | 12/1983 | Meyn et al. |
| 4,434,526 A | 3/1984 | van Mil |
| 4,439,891 A | 4/1984 | van Mil |
| 4,468,838 A | 9/1984 | Sjöström et al. |
| 4,510,886 A | 4/1985 | van Mil |
| 4,514,879 A | 5/1985 | Hazenbroek |
| 4,516,290 A | 5/1985 | van Mil |
| 4,524,489 A | 6/1985 | van Mil |
| 4,558,490 A | 12/1985 | Hazenbroek et al. |
| 4,559,672 A | 12/1985 | Hazenbroek et al. |
| 4,567,624 A | 2/1986 | van Mil |
| 4,570,295 A | 2/1986 | van Mil |
| 4,574,429 A | 3/1986 | Hazenbroek |
| 4,577,368 A | 3/1986 | Hazenbroek |
| D283,289 S | 4/1986 | Hazenbroek |
| 4,593,432 A | 6/1986 | Hazenbroek |
| 4,597,133 A | 7/1986 | van den Nieuwelaar |
| 4,597,136 A | 7/1986 | Hazenbroek |
| 4,635,317 A | 1/1987 | van der Eerden |
| 4,639,973 A | 2/1987 | van der Eerden |
| 4,639,974 A | 2/1987 | Olson |
| 4,639,975 A | 2/1987 | van der Eerden |
| 4,646,384 A | 3/1987 | van der Eerden |
| 4,651,383 A | 3/1987 | van der Eerden |
| 4,653,147 A | 3/1987 | van der Eerden |
| 4,682,386 A | 7/1987 | Hazenbroek et al. |
| 4,704,768 A | 11/1987 | Hutting et al. |
| 4,723,339 A | 2/1988 | van den Nieuwelaar et al. |
| 4,724,581 A | 2/1988 | van den Nieuwelaar |
| 4,736,492 A | 4/1988 | Hazenbroek |
| RE32,697 E | 6/1988 | Hazenbroek et al. |
| 4,765,028 A | 8/1988 | van den Nieuwelaar et al. |
| 4,766,644 A | 8/1988 | van den Nieuwelaar et al. |
| 4,769,872 A | 9/1988 | Hazenbroek et al. |
| 4,779,308 A | 10/1988 | van den Nieuwelaar et al. |
| 4,788,749 A | 12/1988 | Hazenbroek et al. |
| 4,811,456 A | 3/1989 | Heuvel |
| 4,811,458 A | 3/1989 | v.d. Nieuwelaar et al. |
| 4,811,462 A | 3/1989 | Meyn |
| 4,813,101 A | 3/1989 | Brakels et al. |
| 4,884,318 A | 12/1989 | Hazenbroek |
| 4,893,378 A | 1/1990 | Hazenbroek |
| 4,894,885 A | 1/1990 | Markert |
| 4,896,399 A | 1/1990 | Hazenbroek |
| 4,899,421 A | 2/1990 | Van Der Eerden |
| 4,918,787 A | 4/1990 | Hazenbroek |
| 4,928,351 A | 5/1990 | van den Nieuwelaar et al. |
| 4,935,990 A | 6/1990 | Linnenbank |
| 4,939,813 A | 7/1990 | Hazenbroek |
| 4,958,694 A | 9/1990 | van den Nieuwelaar et al. |
| 4,965,908 A | 10/1990 | Meyn |
| 4,972,549 A | 11/1990 | van den Nieuwelaar et al. |
| 4,993,113 A | 2/1991 | Hazenbroek |
| 4,993,115 A | 2/1991 | Hazenbroek |
| 5,001,812 A | 3/1991 | Hazenbroek |
| 5,013,431 A | 5/1991 | Doets |
| 5,015,213 A | 5/1991 | Hazenbroek |
| 5,019,013 A | 5/1991 | Hazenbroek |
| 5,026,983 A | 6/1991 | Meyn |
| 5,035,673 A | 7/1991 | Hazenbroek |
| 5,037,351 A | 8/1991 | van Den Nieuwelaar et al. |
| 5,041,054 A | 8/1991 | van den Nieuwelaar et al. |
| 5,045,022 A | 9/1991 | Hazenbroek |
| 5,060,596 A | 10/1991 | Esbroeck |
| 5,064,402 A | 11/1991 | Koops |
| 5,067,927 A | 11/1991 | Hazenbroek et al. |
| 5,069,652 A | 12/1991 | Hazenbroek |
| 5,074,823 A | 12/1991 | Meyn |
| 5,088,959 A | 2/1992 | Heemskerk |
| 5,090,940 A | 2/1992 | Adkison |
| 5,098,333 A | 3/1992 | Cobb |
| 5,104,351 A | 4/1992 | van den Nieuwelaar et al. |
| 5,122,090 A | 6/1992 | van den Nieuwelaar et al. |
| 5,123,871 A | 6/1992 | van den Nieuwelaar et al. |
| 5,125,498 A | 6/1992 | Meyn |
| 5,147,240 A | 9/1992 | Hazenbroek et al. |
| 5,147,241 A | 9/1992 | Rudin |
| 5,154,664 A | 10/1992 | Hazenbroek et al. |
| 5,154,665 A | 10/1992 | Hazenbroek |
| RE34,149 E | 12/1992 | Markert |
| 5,173,076 A | 12/1992 | Hazenbroek |
| 5,173,077 A | 12/1992 | van den Nieuwelaar et al. |
| 5,176,563 A | 1/1993 | van den Nieuwelaar et al. |
| 5,176,564 A | 1/1993 | Hazenbroek |
| 5,178,890 A | 1/1993 | van den Nieuwelaar et al. |
| 5,186,679 A | 2/1993 | Meyn |
| 5,188,559 A | 2/1993 | Hazenbroek |
| 5,188,560 A | 2/1993 | Hazenbroek |
| 5,194,035 A | 3/1993 | Dillard |
| 5,197,917 A | 3/1993 | Verbakel et al. |
| 5,199,922 A | 4/1993 | Korenberg et al. |
| 5,222,905 A | 6/1993 | Van den Nieuwelaar et al. |
| 5,228,881 A | 7/1993 | Sekiguchi |
| 5,242,324 A | 9/1993 | Koops |
| 5,248,277 A | 9/1993 | Bos et al. |
| 5,256,101 A | 10/1993 | Koops |
| 5,269,721 A | 12/1993 | Meyn |
| 5,277,649 A | 1/1994 | Adkison |
| 5,277,650 A | 1/1994 | Meyn |
| 5,279,517 A | 1/1994 | Koops |
| 5,290,187 A | 3/1994 | Meyn |
| 5,299,975 A | 4/1994 | Meyn |
| 5,299,976 A | 4/1994 | Meyn |
| 5,318,428 A | 6/1994 | Meyn |
| 5,326,311 A | 7/1994 | Persoon et al. |
| 5,334,083 A | 8/1994 | van den Nieuwelaar et al. |
| 5,336,127 A | 8/1994 | Hazenbroek |
| 5,340,351 A | 8/1994 | Minderman et al. |
| 5,340,355 A | 8/1994 | Meyn |
| 5,342,237 A | 8/1994 | Kolkman |
| 5,344,359 A | 9/1994 | Kolkman |
| 5,344,360 A | 9/1994 | Hazenbroek |
| 5,366,406 A | 11/1994 | Hobbel et al. |
| 5,370,574 A | 12/1994 | Meyn |
| 5,372,246 A | 12/1994 | van Aalst |
| RE34,882 E | 3/1995 | Meyn |
| 5,401,210 A * | 3/1995 | Manmoto et al. ............. 452/136 |
| 5,429,549 A | 7/1995 | Verrijp et al. |
| 5,439,702 A | 8/1995 | French |
| 5,453,045 A | 9/1995 | Hobbel et al. |
| 5,462,477 A * | 10/1995 | Ketels ........................ 452/135 |
| 5,470,194 A | 11/1995 | Zegers |
| 5,487,700 A | 1/1996 | Dillard |
| 5,494,479 A * | 2/1996 | Lindert et al. ................ 452/135 |
| 5,505,657 A | 4/1996 | Janssen et al. |
| 5,549,521 A | 8/1996 | van den Nieuwelaar et al. |
| D373,883 S | 9/1996 | Dillard |
| 5,569,067 A | 10/1996 | Meyn |
| 5,595,066 A | 1/1997 | Zwanikken et al. |
| 5,605,503 A | 2/1997 | Martin |
| 5,643,072 A | 7/1997 | Lankhaar et al. |
| 5,643,074 A | 7/1997 | Linnenbank |
| 5,672,098 A | 9/1997 | Veraart |
| 5,676,594 A | 10/1997 | Joosten |
| 5,704,830 A | 1/1998 | Van Ochten |
| 5,713,786 A | 2/1998 | Kikstra |
| 5,713,787 A * | 2/1998 | Schoenmakers et al. ...... 452/136 |
| 5,741,176 A | 4/1998 | Lapp et al. |
| 5,755,617 A | 5/1998 | van Harskamp et al. |
| 5,759,095 A | 6/1998 | De Weerd |
| 5,766,063 A | 6/1998 | Hazenbroek et al. |
| 5,782,685 A * | 7/1998 | Hazenbroek et al. ......... 452/138 |
| 5,785,588 A | 7/1998 | Jacobs et al. |
| 5,803,802 A | 9/1998 | Jansen |

(56) References Cited

U.S. PATENT DOCUMENTS

| | | |
|---|---|---|
| 5,810,651 A | 9/1998 | De Heer et al. |
| 5,810,653 A | 9/1998 | Van Craaikamp et al. |
| 5,813,908 A * | 9/1998 | Craaikamp .................. 452/136 |
| 5,827,116 A | 10/1998 | Al et al. |
| 5,833,527 A | 11/1998 | Hazenbroek et al. |
| 5,865,672 A | 2/1999 | Hazenbroek |
| 5,875,738 A | 3/1999 | Hazenbroek et al. |
| 5,947,811 A | 9/1999 | Hazenbroek et al. |
| 5,951,393 A | 9/1999 | Barendregt |
| 5,975,029 A | 11/1999 | Morimoto et al. |
| 5,976,004 A * | 11/1999 | Hazenbroek .................. 452/136 |
| 5,980,377 A | 11/1999 | Zwanikken et al. |
| 6,007,416 A | 12/1999 | Janssen et al. |
| 6,007,417 A * | 12/1999 | Jones et al. .................. 452/138 |
| 6,024,636 A | 2/2000 | Hazenbroek et al. |
| 6,027,403 A | 2/2000 | Hazenbroek et al. |
| 6,027,404 A * | 2/2000 | Wols .......................... 452/138 |
| 6,029,795 A | 2/2000 | Janssen et al. |
| 6,062,972 A | 5/2000 | Visser |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,067 B1 * | 5/2002 | Kessel .......................... 452/138 |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,599,179 B1 | 7/2003 | Hazenbroek et al. |
| 6,612,919 B2 | 9/2003 | Janset et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 | 7/2004 | Hazenbroek et al. |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 6,986,707 B2 | 1/2006 | van Den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 | 6/2007 | Annema et al. |
| 7,232,366 B2 | 6/2007 | van den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,437 B2 | 3/2008 | Van den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 8,157,625 B2 * | 4/2012 | Hazenbroek et al. ......... 452/136 |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0298404 A1 | 12/2009 | Van Der Stouw |
| 2009/0320761 A1 | 12/2009 | Grave et al. |
| 2010/0022176 A1 | 1/2010 | Van De Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn |

FOREIGN PATENT DOCUMENTS

| | | |
|---|---|---|
| EP | 0 786 208 A1 | 7/1997 |
| EP | 1 053 684 A1 | 11/2000 |
| EP | 2 181 841 A1 | 5/2010 |

OTHER PUBLICATIONS

Written Opinion—PCT/NL2011/050042.

* cited by examiner

METHOD AND APPARATUS FOR REMOVING A SLEEVE OF MEAT FROM AN ANIMAL PART HAVING BONE WITH KNUCKLES ON EACH OF ITS OPPOSITE ENDS

REFERENCE TO RELATED APPLICATION

Priority is hereby claimed under 35 USC §119 to the filing date of Dutch patent application number N2004149 filed in the Netherlands on Jan. 26, 2010.

TECHNICAL FIELD

This disclosure relates generally to a method and apparatus for deboning extremity parts of slaughtered animals that have an elongate bone shaft terminating at opposite ends in first and second knuckles. More particularly, the disclosure relates to methods and devices for deboning poultry thighs from chicken and turkey.

BACKGROUND

Methods and apparatuses for removing meat from the bone of an animal part such as a poultry thigh have been proposed in, for example, prior patent publications U.S. Pat. No. 3,672,000; U.S. Pat. No. 4,327,463; U.S. Pat. No. 4,495,675; U.S. Pat. No. 4,639,974; and U.S. Pat. No. 4,893,378. In such methods and apparatuses a sleeve of meat surrounding the bone shaft is progressively stripped from the bone and forced over the second knuckle to free the meet from the bone. To permit passage of the meat over the second knuckle, meat stripper assemblies or diaphragms employed by the prior art need to have an opening large enough to allow passage of the second knuckle through the stripper. A meat stripper having an opening of a fixed size that is large enough to pass the second knuckle will not work properly as significant portions of meat will be left on the bone shaft, while the meat that has been removed will be damaged and become undesirable for further use. It is for at least this reason that in most known deboning assemblies, the opening of the meat stripper assembly is made to be variable.

Several mechanisms have been conceived to allow the stripper assembly opening to be varied in size when engaging and passing the bone and second knuckle of an animal part. Some of these mechanisms have added substantial complication to, as well as hampered the reliability of, the known meat removing and deboning apparatuses. Therefore a more recent approach has been to employ flexible rubber or elastomeric stripper disks having a center aperture providing a circumferential stripper edge. As a bone is forced through such a stripper disc, the aperture varies in size to accommodate size changes in the bone and widens to allow passage of the knuckles.

While the use of flexible stripper disks has reduced structural complications and enhanced reliability of operation, it has also introduced problems associated with the relatively rapid wear of the flexible stripper disks and the accompanying downtime for periodic replacements worn stripper disks. It is not uncommon, for instance, for these flexible stripper disks to require replacement after processing 600 kg of meat. Furthermore it has been necessary to insert the animal part initially at one of its knuckle ends through the central aperture of the flexible stripper disk. The management of the animal part to insure reliable initial insertion through the disc is not an easy matter to control, particularly given the ever increasing demand for meat processing speed. Thus, misfeeds of animal parts occur, resulting in damaged product and lower production rates.

Accordingly, a need exists in the poultry processing industry to overcome or ameliorate at least one of the disadvantages of the prior art addressed above as well as other disadvantages. There is a related need for alternative structures that are less cumbersome in assembly and operation and that moreover can be made relatively inexpensively. A need at least exists to provide consumers with a useful choice. It is to the provision of a method and apparatus that addresses these and other needs that the present invention is primarily directed.

SUMMARY

Briefly described, a method and apparatus are disclosed for automatically removing a sleeve of meat from an animal part having an internal bone with a first knuckle on one of two opposite ends of a bone shaft and a second knuckle on another of the two opposite ends. The method includes engaging the bone of the animal part with part of a meat stripper between the first knuckle of the bone and the sleeve of meat. The bone is then engaged by a knuckle gripper between the part of the meat stripper and the first knuckle and the meat stripper and the knuckle gripper are moved away from one another to strip meat from the bone toward the second knuckle. The relative movement of the meat stripper and the knuckle gripper is discontinued when the part of the meat stripper engages the second knuckle. A meat cutter is then advanced in a direction towards the meat stripper on a side opposite the knuckle gripper, thereby cutting the sleeve of meat gathered by the meat stripper circumferentially around the second knuckle. The method then comprises retracting the meat cutter, disengaging the knuckle gripper, removing the bone from the gathered sleeve of meat and from the meat stripper. The gathered sleeve of meat is then removed for further processing, and the bone is discarded. An apparatus is disclosed for performing at least the necessary minimum of steps of the method according to the disclosure.

Thus, a method and apparatus is disclosed for deboning animal parts, and particularly chicken and turkey thighs, that addresses and overcomes the shortcomings of the prior art and other shortcomings. Further advantageous aspects and features of the invention will become clear upon review of the following description of particular exemplary embodiments, taken in conjunction with the accompanying drawing figures, which are briefly described as follow.

DETAILED DESCRIPTION

Figure 1:
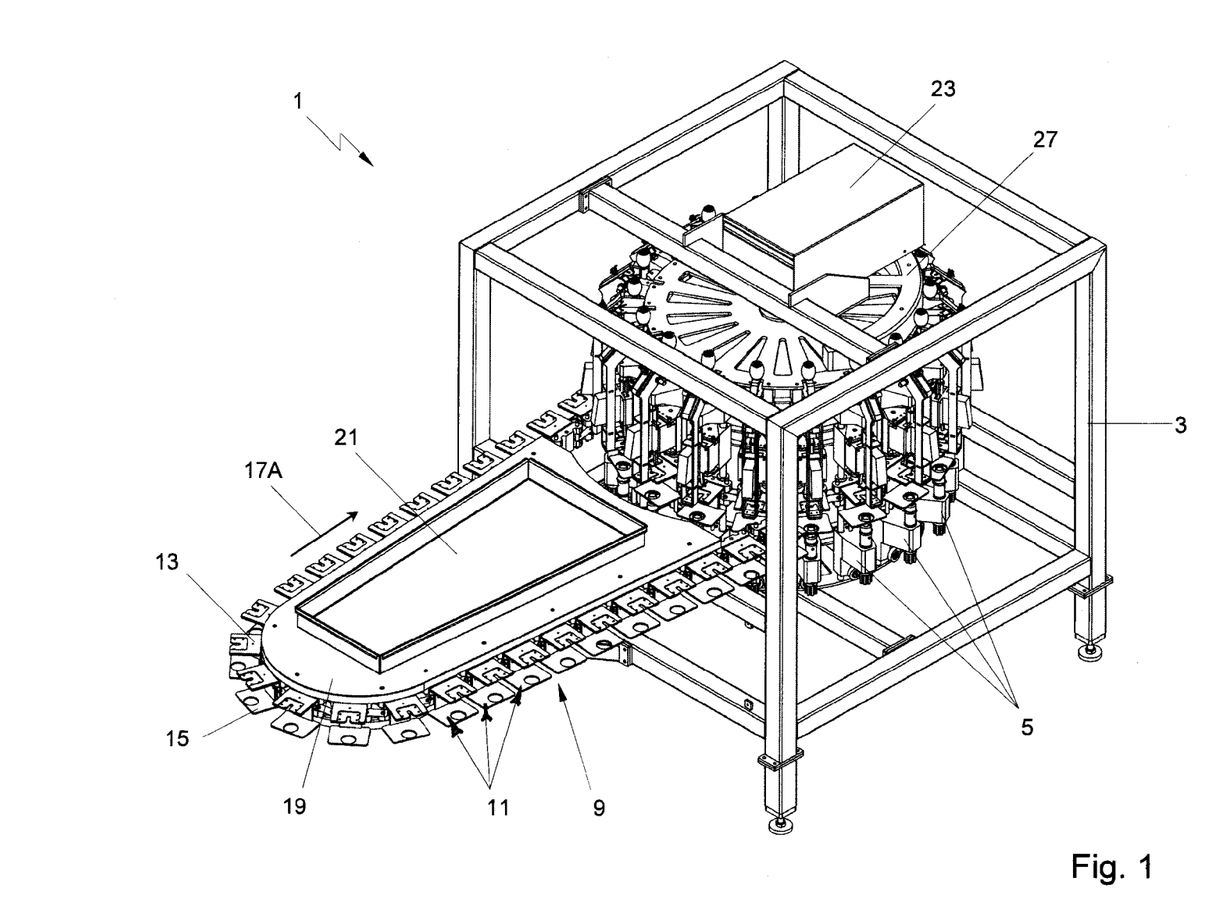
FIG. 1 is a perspective view of a meat stripping apparatus that embodies principles of the invention in one preferred form.
Figure 2:
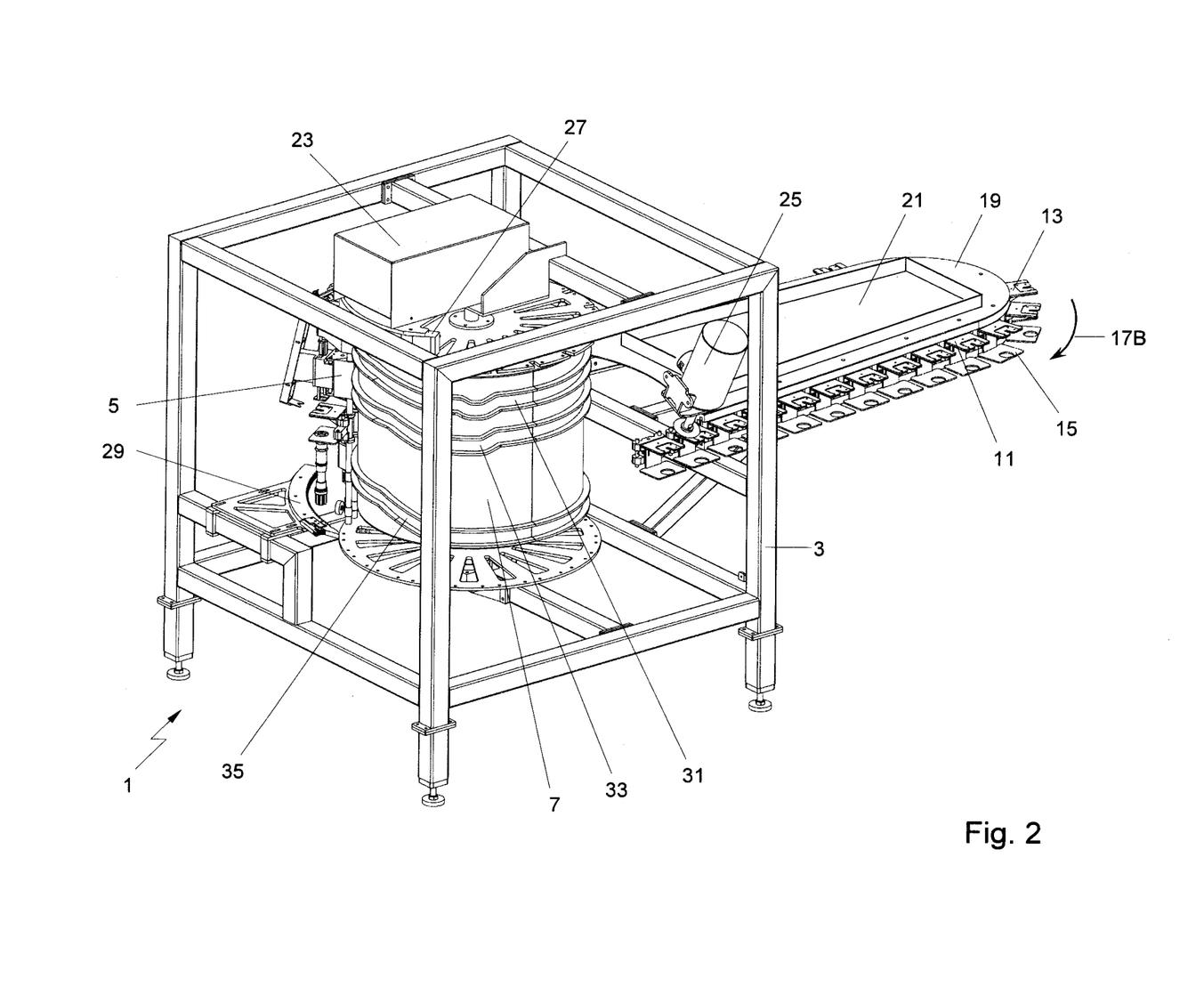
FIG. 2 is a perspective view of the apparatus of FIG. 1 with elements deleted to reveal other structural elements.

Reference will now be made to the accompanying drawing figures, wherein like reference numerals may refer to like parts throughout the several views. Referring first to FIG. 1, there is shown a meat stripping apparatus 1 for performing the method according to one embodiment of the invention. The meat stripping apparatus 1 has a supporting framework 3. Mounted for rotation within the framework 3 is an array of meat stripper or deboning modules 5 that revolve in a carousel around a stationary cam track drum 7 (FIG. 2). Also extending around the stationary cam track drum 7 is an endless conveyor 9 that is movable in a path that, along part of its length, coincides with the revolving deboning modules 5. The endless conveyor 9 includes a plurality of carriers 11, each including a slotted first meat stripper jaw 13 and an optional meat support shelf 15. The carriers 11, in use, are moved by the conveyor 9 in the direction of arrows 17A, 17B (FIGS. 1 and 2 respectively) about loading table 19, provided with a tray 21 for holding a supply of animal thighs. In the illustrated embodiment, the path through which the conveyor 9 moves coextends for approximately 180° with that through which the carousel of deboning modules 5 revolves, although this is not a limitation of the invention.

The deboning modules 5 as shown in the embodiment of FIGS. 1 and 2 are generally vertically arranged as taught, amongst others, by U.S. Pat. No. 4,893,378, the disclosure of which is hereby incorporated by reference. Such a vertical arrangement is generally more compact and may be of advantage when the equipment needs to be placed in an already existing meat processing plant. In such a situation, doorways and aisles may restrict access and the apparatus may need to fit in a somewhat confined space. As taught by U.S. Pat. No. 5,782,685, hereby incorporated by reference, it is also possible to arrange the deboning modules horizontally. These examples will assist the skilled artisan in understanding better the embodiments discussed herein.

Operating personnel or workers may take a position adjacent the loading table 19 and manually position or place the animal thighs supplied in the tray 21 into the carriers 11. This is done by engaging the bone of the animal thigh into the slotted first meat stripper jaw 13 such that the first meat stripper jaw 13 engages between a first knuckle (B in FIG. 7) of the animal bone and the sleeve of meat surrounding it (D in FIG. 7). A second knuckle (C in FIG. 7) of the bone is thereby suspended above the meat support shelve 15. The loading can be done by one worker, or by several workers, depending on the required operating speed of the apparatus.

The meat support shelves 15, which aid in the collection of meat as detailed below, are optional. For instance, when the apparatus 1 is arranged with the deboning modules in a horizontal orientation rather than the illustrated vertical orientation, other means may be employed for assisting in the collection of the meat. It is also possible to associate the meat supporting shelves 15 with each of the revolving modules 5.

Both the conveyor 9 and the rotating deboning modules 5 are driven by a drive unit 23 (FIG. 2). The drive unit 23 drives the deboning modules 5 to revolve them about the stationary cam drum 7 as a carousel and this carousel in turn drives the endless conveyor 9 by engagement of the individual deboning modules 5 with corresponding individual carriers 11. Thereby the carriers 11 are moved through a processing path in the direction of arrows 17A, 17B as mentioned. On their way toward the carousel of deboning modules 5, animal thighs suspended in the carriers 11 first are engaged by a rotating cutter 25, which at least partially cuts the sleeve of meat from the bone adjacent to the first knuckle (B in FIG. 7). This is best shown in FIG. 2, which is a view of the apparatus 1 seen from a perspective different from that of FIG. 1. Also in FIG. 2, several of the deboning modules 5 are deleted to reveal the stationary cam drum 7 underneath.

Each carrier 11 of the conveyor chain 9 represents or coincides with a link of a conveyor chain. Each link represented by one of the carriers 11, upon meeting with the carrousel of deboning modules 5, is engaged by and aligns with a successive one of these deboning modules 5. When the engaged carriers 11 and deboning modules 5 rotate through the semi circle opposite of the loading table 19, they together form or define a deboning unit. The deboning process will be described in more detail in reference to the FIGS. 3 to 7. Before describing that process in detail, it may be useful to note that in FIGS. 1 and 2 there is also visible a perimeter ramp 27 that extends partially above the carousel of deboning modules 5. At a lower end of the perimeter ramp 27, the framework 3 also supports a stationary toothed segment 29, visible in FIG. 2. FIG. 2 also shows that the cam drum 7 has a first upper cam track 31, a second intermediate cam track 33, and a third lower cam track 35.

Figure 7:
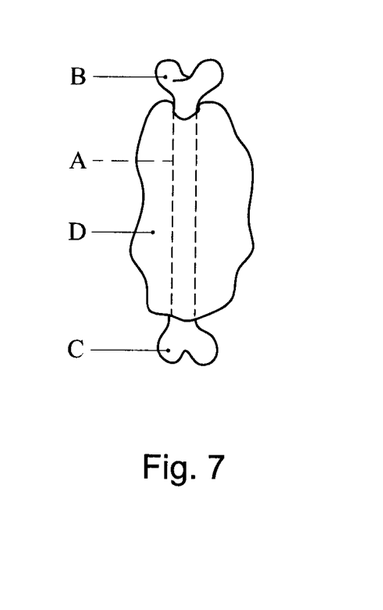
FIG. 7 schematically shows an animal part such as may be deboned by the meat stripper apparatus of the invention.

Referring to FIG. 7, each of the animal parts, which may be poultry thighs, includes an elongate bone shaft (A) surrounded by a sleeve of meat (D). Each end of the elongate bone shaft (A) carries a respective one of first and second knuckles (B, C). The first (B) and the second (C) knuckles can differ in size depending on the type of animal part, such as chicken or turkey thighs. Also the length of the bone shaft (A) may vary to some extent.

As arranged on the carriers 11, the animal parts are transported through the processing path in a direction substantially transverse to the longitudinal extent of the elongate bone shafts (A). As explained above, the carriers 11 are moved as an endless conveyor chain. The conveyor 9 thus is guided through substantially linear loading sections or paths on opposite sides of the loading table 19. At the free end of the loading table 19 there may be provided an idler sprocket wheel, or a curved sliding surface (not shown, but conventional) around which the conveyor chain moves. Engagement and alignment of each of the carriers 11 with a respective one of the revolving deboning modules 5 takes place downstream of the loading table 19 with the deboning modules 5 in the carousel's semi-circle opposite of the loading table 19.

Figure 4:
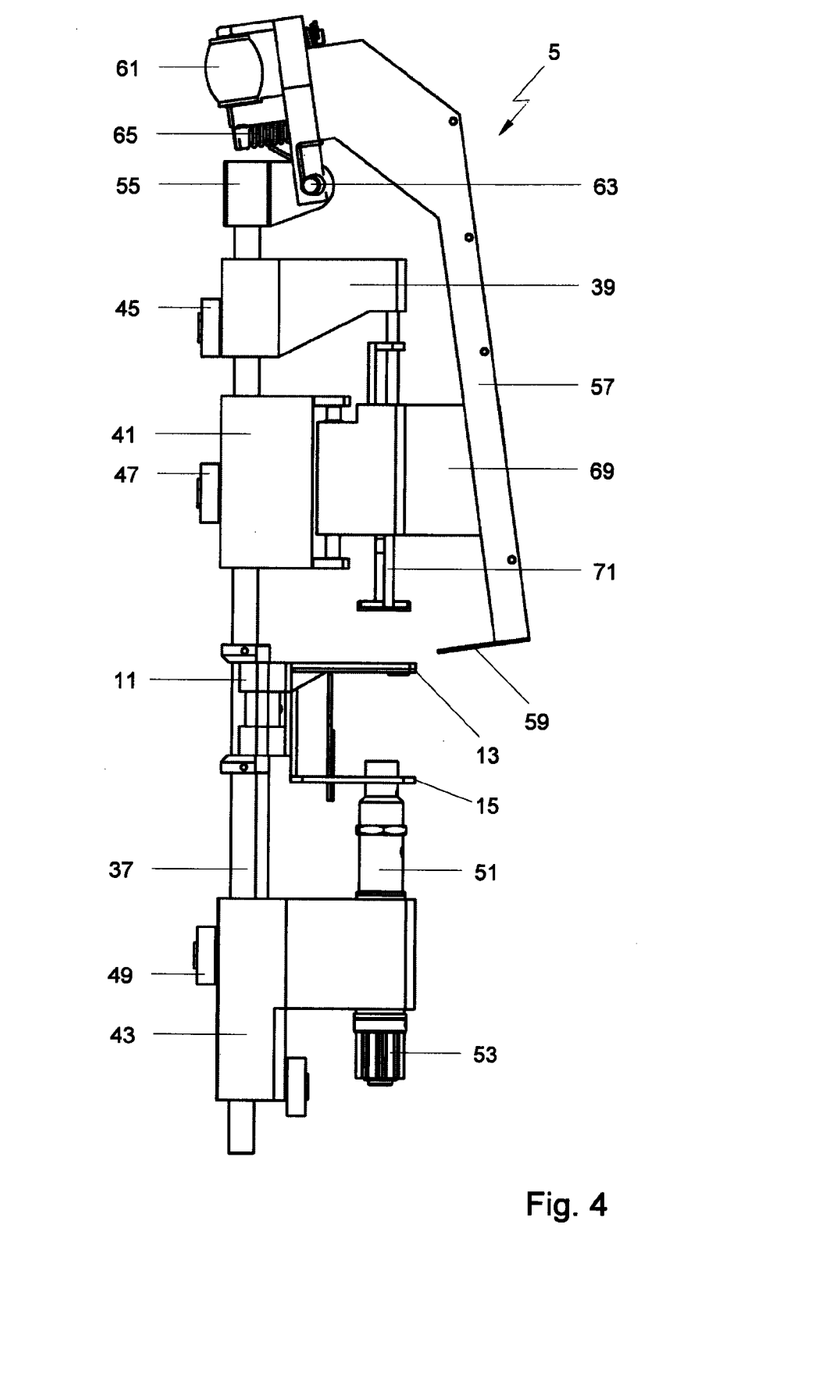
FIG. 4 is a side view of the meat stripping module of FIG. 3.
Figure 5:
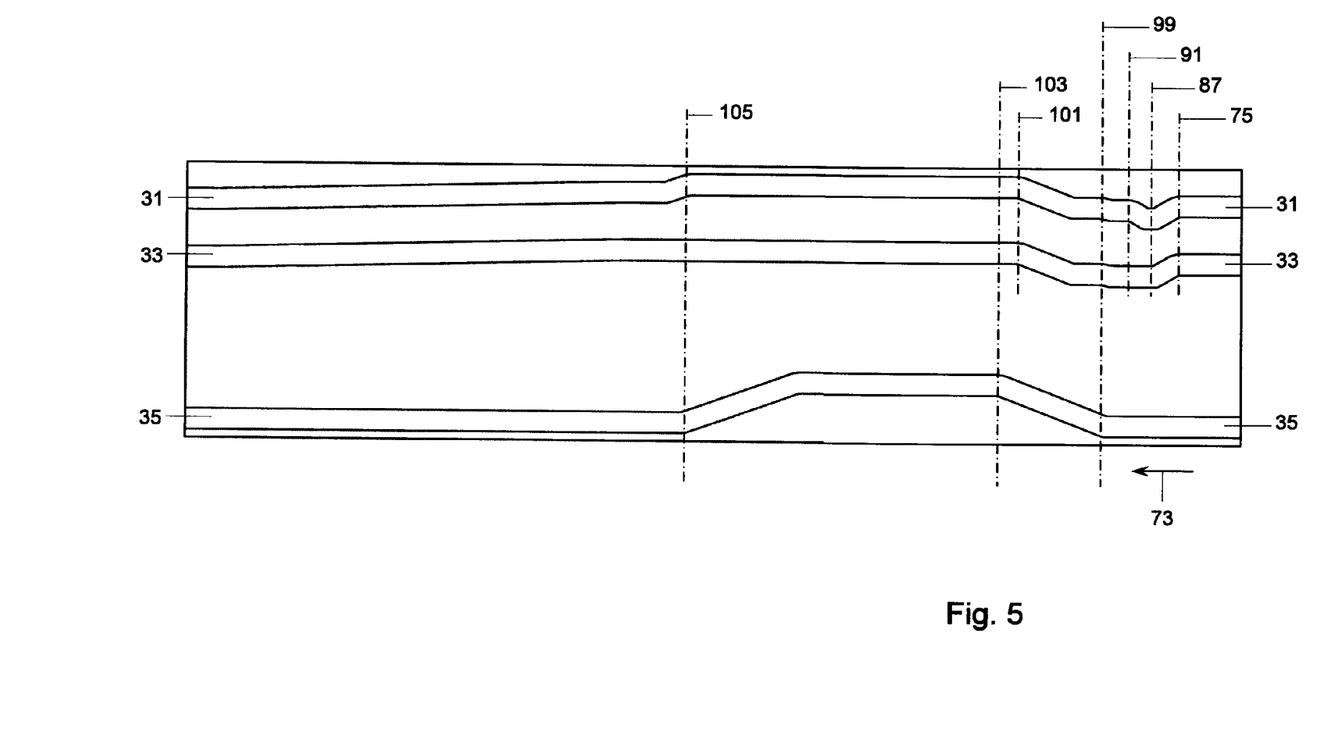
FIG. 5 is a deployed planar of a continuous cam track for controlling the meat stripping modules in the apparatus.

As perhaps best shown in FIG. 4, each deboning module 5 has a guide structure 37, in the form of a pair of guide rods, on which are slidably engaged a first relatively moveable knuckle gripper carrier 39, a second relatively moveable knuckle gripper carrier 41 and a meat cutter carrier 43. The first relatively moveable knuckle gripper carrier 39 has a first guide roller 45 for engaging within the upper cam track 31 (see FIGS. 2 and 5). The second relatively moveable knuckle gripper carrier 41 has a second guide roller 47 for engaging within the intermediate cam track 33 (FIGS. 2 and 5). The meat cutter carrier 43 has a third guide roller 49 for engaging within the lower cam track 35. The meat cutter carrier 43 is further provided with a rotatable circumferential meat cutter 51, which on its lower end is provided with a toothed pinion 53. The toothed pinion 53 is positioned for engagement with the toothed segment 29 (FIG. 2) as the deboning module rotates past the toothed segment to rotate the meat cutter 51.

At an upper end of the guide structure 37 is attached a trunnion block 55, onto which is pivotally linked a meat stripper arm 57. The meat stripper arm 57 carries on its free end a second meat stripper jaw 59. The second meat stripper jaw 59 may have a slotted edge similar to the first meat stripper jaw 13 to overlap therewith in a closed position to define an opening. To move the meat stripper arm 57 from the open position, shown in FIG. 4, to a closed position, in which the second jaw 59 overlaps with the first jaw 13, an egg or barrel shaped roller 61 is provided on an end of the meat stripper arm 57 beyond the trunnion block 55. The meat stripper arm 57 is pivoted to the trunnion block 55 by means of a pivot pin 63, and is biased to its open position by a compression spring 65. The barrel shaped roller 61, while the meat stripper module 5 is rotated about the cam drum 7, engages with the perimeter ramp 27 at a predetermined point of its travelling path. Engagement between the perimeter ramp 27 (FIGS. 1 and 2) and the barrel shaped roller 61 will move the meat stripper arm 57 about its pivot pin 63 toward its closed position. When the barrel shaped roller 61 eventually moves beyond the perimeter ramp 27, the spring 65 moves the meat stripper arm 57 back to its open position.

Figure 3:
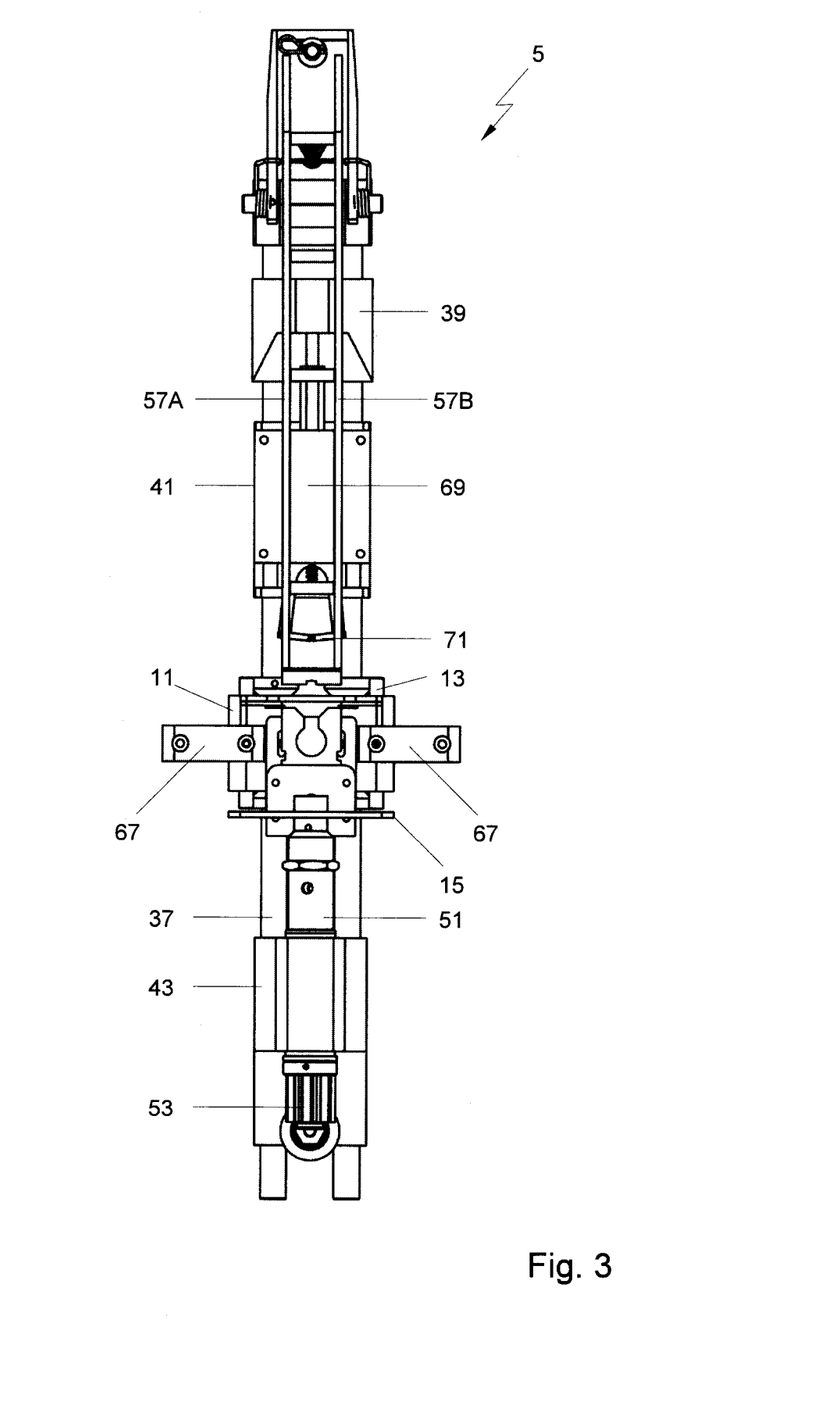
FIG. 3 is a front elevation of an individual meat stripping module of the apparatus of FIGS. 1 and 2.
Figure 6:
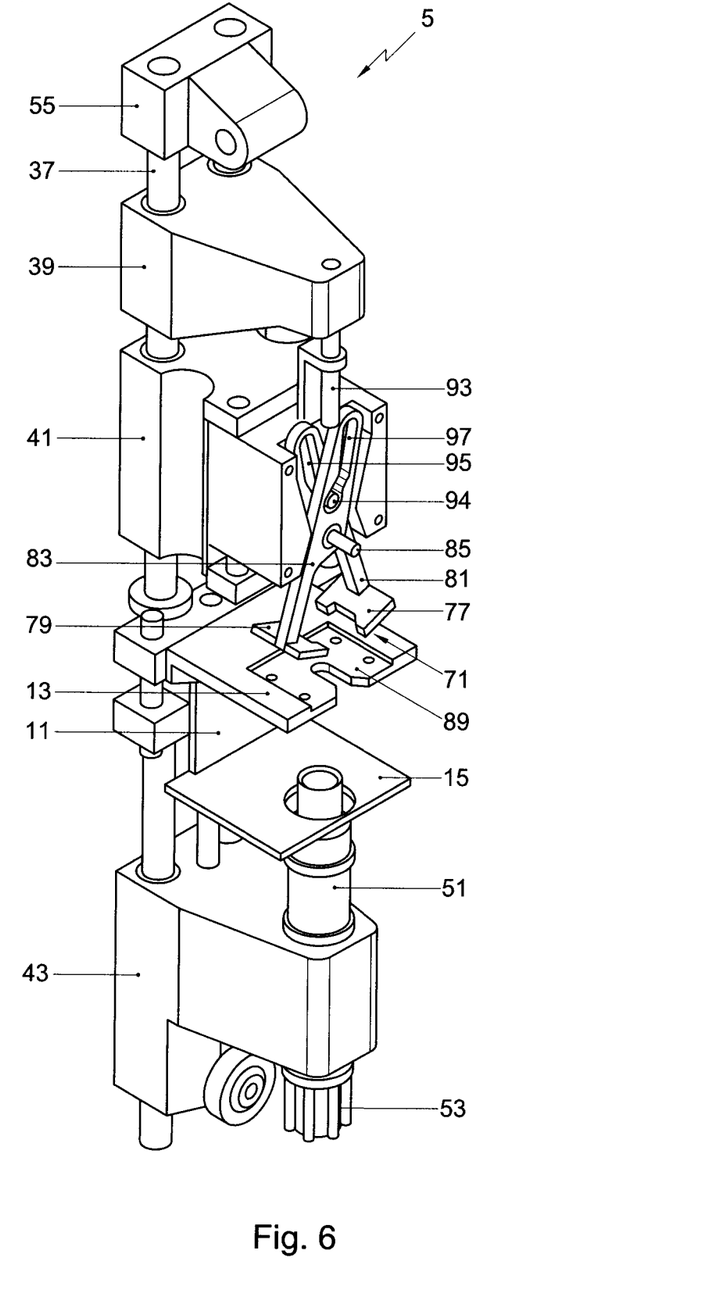
FIG. 6 is a perspective view of a meat stripping module with part of the meat stripper deleted to reveal its knuckle gripper.

The carrier 11 in FIGS. 3, 4 and 6 is illustrated in its operative position on the meat stripper module 5, as it when engaged and aligned therewith. Indeed the engagement between the carrier 11 and meat stripper module 5 is such that these work together as a single unit during the entire duration of their mutual engagement. From the front elevation of FIG. 3 it will be seen that the carrier 11 may be provided with conveyor chain links 67 for interconnecting with adjacent carriers 11. It is further seen in FIGS. 3 and 4 that the second knuckle gripper carrier 41 may optionally be provided with a guiding protrusion 69, which guides the meat stripper arm 57 by engaging between its spaced pair of arm members 57A and 57B (FIG. 3). Referring to FIG. 6, the meat stripper module 5 of FIGS. 3 and 4 is shown in an isometric view with the meat stripper arm 57 (of FIGS. 3 and 4) and the guiding protrusion 69 deleted for clarity. This view reveals perhaps more clearly the mechanism of the knuckle gripper 71.

FIG. 5 shows preferred configurations of the upper intermediate and lower cam tracks 31, 33, 35 as an unwound or flat circumferential surface of the cam drum 7. At a right hand end of FIG. 5, the conveyor chain carriers 11 have just engaged with their respective deboning module 5, and the combined unit moves in the direction of arrow 73. The first guide roller 45 and the second guide roller 47 are engaged in their relevant cam tracks 31 and 33 respectively. The guide rollers are moved by their cam tracks upwardly and downwardly to manipulate the actions of various elements of the deboning units. More specifically, in a first interval 75 the first and second knuckle gripper carriers 39, 41 move together towards the animal part carrier 11. The knuckle gripper 71, as shown in FIG. 6, has first and second knuckle gripper jaws 77 and 79.

Each of the first and second knuckle gripper jaws 77, 79 is mounted on a relevant knuckle gripper scissor arm 81, 83, pivoted about a common central pivot pin 85. When the deboner module 5 is moved from first interval 75 through second interval 87 (FIG. 5), the first and second jaws 77, 79 of the knuckle gripper 71 remain in the open position shown in FIG. 6 and are moved over the first knuckle B of the animal part (FIG. 7). The animal part, when in position on the carrier 11, is engaged with its first knuckle B above the first stripper jaw 13 and with its sleeve of meat D below the first stripper jaw 13. The first stripper jaw 13 as seen in FIG. 6 can have an exchangeable slotted insert 89 to be able to adapt the deboner/meat stripper modules to different bone sizes. It is also conceivable that the slotted insert 89 is made of a deformable or flexible material as an alternative. In a preferred embodiment, the slotted insert 89 is made of stainless steel with its downwardly directed face covered with a wear resistant material, such as Nylon, against which the rotatable meat cutter 51 engages. A similar slotted insert may be provided in the second meat stripper jaw 59. Once the first and second gripper jaws 77, 79 have moved close enough to the first meat stripper jaw 13, movement from the second interval 87 towards a third interval 91 of the cam drum 7 (see FIG. 5), moves the first knuckle gripper carrier 39 back, relative to the second knuckle gripper carrier 41, which closes the knuckle gripper 71 about a bone shaft A.

As seen in FIG. 6, the first knuckle gripper carrier 39 has an extension 93 having a lower end provided with a transversely extending pin 94 commonly engaged in elongate first and second slots 95, 97 in the first and second knuckle gripper arms 81, 83. Translatory movement of the extension 93 and pin 94 from the position illustrated in FIG. 6 aligns the elongate slots 95, 97 and thereby closes the knuckle gripper jaws 77, 79, through the respective first and second scissor arms 81, 83.

From the third interval 91 onwards, the knuckle gripper jaws 77, 79 are closed. At a fourth interval 99 (see FIG. 5) the knuckle gripper 71 is withdrawn a small distance by the upper and intermediate cam tracks 31, 33 to enable lowering of the second meat stripper jaw 59, of which the barrel shaped roller 61 has started to engage the perimeter ramp 27. Also at the fourth interval 99, the lower cam track 35 starts to advance the meat cutter carrier 43 and thereby to move the circumferential meat cutter 51 towards the first and second meat stripper jaws 13, 59. While the circumferential cutter 51 is advanced between the fourth interval 99 and a fifth interval 101, the knuckle gripper 71 is moved upwardly and away from the meat stripper jaws 13, 59 by the first and second guide rollers 45, 47 following the upper and intermediate cam tracks 31, 33.

Because the meat stripper jaws 13, 59 are retained at a fixed level throughout their entire conveying path, the upward movement of the knuckle gripper strips the sleeve of meat from the bone towards the second knuckle C of the bone shaft A, by effectively pulling the bone shaft through the closed meat stripper jaws 13, 59. The sleeve of meat, still attached to the second knuckle C is collected at the lower side of the meat stripper jaws 13, 59 around the second knuckle C and gathered upwardly of the meat support shelve 15. At the fifth interval 101 the knuckle gripper 71 has reached its maximum distance from the meat stripper jaws 13, 59.

From the fifth interval 101 onward, the circumferential meat cutter 51 completes its movement towards the first and second meat stripper jaws 13, 59 until it reaches a sixth interval 103. Starting at the sixth interval 103 the toothed pinion 53 of the meat cutter 51 engages the toothed segment 29 (see FIGS. 2 and 5) and continued movement of the deboning modules 5 around the cam drum 7 thereby results in rotation of each of the pinions 53 by the toothed segment 29. This causes the circumferential meat cutter with its sharpened end to rotate so that it may cut meat from around the adjacent second knuckle C of the bone.

During initial cutting of the meat by the rotating circumferential meat cutter 51, the knuckle gripper 71 may also be pre-tensioned or spring biased for slight further upward movement to ensure that the second knuckle C is moved upwardly during the circumferential cutting step, irrespective of the exact length of the bone shaft D, which may vary from one animal part to the next. At a seventh interval 105, as indicated in FIG. 5, the circumferential cutter 51 has moved beyond the toothed segment 29 and has also been returned to its initial position, having completed the cutting of meat from around the second knuckle C. From the seventh interval 105 onward the upper cam track 31 moves again back towards the intermediate cam track 33, which releases the grip of the knuckle gripper jaws 77, 79, after which the bone may be removed from the carrier 11 and the gathered sleeve of meat D removed from between the first meat stripper jaw 13 and the meat support shelve 15. At this stage the second meat stripper jaw 59 by its arm 57 and barrel shaped roller 61 may also become released from the perimeter ramp 27 and opened by spring 65.

It will be clear that references in the above to upper, lower, lifting, raising and lowering have been chose for ease of reference in describing the present vertical embodiment. It should however also be clear to the skilled artisan that when a horizontal embodiment in the manner of U.S. Pat. No. 5,782,685 is used, these orientational references are to be construed to have meanings commensurate with the different horizontal orientation.

Accordingly, the method performed by the apparatus 1 includes, in one embodiment, the steps of engaging the bone of the animal part with a part of a meat stripper (such as the first meat stripper jaw 13) between its first knuckle (B) and the sleeve of meat (D) and engaging the bone by the knuckle gripper 71, and its jaws 77, 79, between the part of the meat stripper (13) and the first knuckle (B). The method continues with moving the meat stripper (preferably the first meat stripper jaw 13 complimented by the second meat stripper jaw 59) and the knuckle gripper 71 away from one another, while stripping and gathering the sleeve of meat (D) towards the second knuckle (C). In a subsequent step, the moving away of the meat stripper (13) and knuckle gripper 71 from one another is discontinued upon the part of the meat stripper (13) engaging the second knuckle (C). In a further step includes advancing the meat cutter 51 in a direction towards the meat stripper (13) opposite the knuckle gripper 71 and cutting with the meat cutter 51 the sleeve of meat (D) gathered by the meat stripper (13) circumferentially around the second knuckle (C). The method finishes by retracting the meat cutter 51, disengaging the knuckle gripper 71 by opening its jaws 77, 79. The bone, now freed from the meat by the meat cutter 51, is removed from the gathered sleeve of meat (D) and from the meat stripper (13). The gathered sleeve of meat (D) is then collected for subsequent processing.

An advantage of the method and apparatus disclosed above is that the stripped meat does not need any additional manual processing for removing remnants of cartilage or gristle as was hitherto necessary. In case of a poultry thigh, the kneecap remains attached to the bone and may be discarded or otherwise processed.

It is believed that the operation and construction of the apparatus of this disclosure will be apparent from the foregoing description. The invention is not limited to any embodiment herein described and, within the purview of the skilled artisan; modifications are possible that are considered to be within the scope of the appended claims. For example, the specific sequence of steps of the method may, in some instances, take place in different orders than described herein within the scope of the invention. Rotation of the deboning units about the stationary drum may be reversed with equivalent results. The specific configurations of the various elements, while preferred, may well be modified by those of skill in the art to accommodate application specific requirements. The process as described herein may include a step referred to as "discarding" the bone. This term is not meant to imply that the bone or bones are thrown away as trash, but instead refers to the process of collecting the bone or bones at a designated location for further disposition, processing, or other use. These and other additions, deletions, and modifications, both subtle and gross, may well be implemented by those of skill in the art without departing from the spirit and scope of the invention defined by the claims hereof. Further kinematic inversions are also considered inherently disclosed and to be within the scope of the present invention. The term comprising when used in this description or the appended claims should not be construed in an exclusive or exhaustive sense but rather in an inclusive sense. Features which are not specifically or explicitly described or claimed may be additionally included in the structure according to the present invention without deviating from its scope.

What is claimed is:

1. A method of removing a sleeve of meat from an animal part having a bone with a first knuckle on one of two opposite ends of the bone shaft and a second knuckle on another of the two opposite ends, the method comprising the steps of:
    (a) engaging the bone of the animal part with a part of a meat stripper between its first knuckle and the sleeve of meat;
    (b) engaging the bone with a knuckle gripper between the part of the meat stripper and the first knuckle;
    (c) moving the meat stripper and the knuckle gripper away from one another to strip and gather the sleeve of meat towards the second knuckle; and
    (d) discontinuing the moving away of the meat stripper and knuckle gripper from one another upon the part of the meat stripper engaging the second knuckle.

2. The method according to claim 1, further comprising:
    upon the engaging the bone with the part of the meat stripper, at least partially advancing a meat cutter in a direction towards the meat stripper opposite of the knuckle gripper;
    cutting the sleeve of meat gathered by the meat stripper circumferentially around the second knuckle with the meat cutter;
    retracting the meat cutter;
    disengaging the knuckle gripper;
    removing the bone from the gathered sleeve of meat and from the meat stripper;
    collecting the gathered sleeve of meat for further processing; and
    discarding the bone.

3. The method claimed in claim 2, wherein the step of cutting the gathered sleeve of meat from around the second knuckle comprises rotating the circumferential meat cutter.

4. The method claimed in claim 1, wherein the step of engaging the bone with the part of the meat stripper comprises engaging the bone between the first knuckle and the sleeve of meat with a first meat stripper jaw.

5. The method claimed in claim 4, wherein prior to moving the meat stripper and the knuckle gripper away from one another, a second meat stripper jaw is closed onto the first meat stripper jaw, such that the bone shaft is circumferentially engaged by the meat stripper.

6. The method claimed in claim 5, wherein prior to removing the bone from the gathered sleeve of meat and from the meat stripper, the second meat stripper jaw is opened.

7. The method claimed in claim 1, wherein prior to engaging the bone by the knuckle gripper, the animal part is passed by a cutter for at least partially cutting the sleeve of meat from the bone adjacent the first knuckle.

8. An apparatus for removing a sleeve of meat from an animal part having a bone with a first knuckle on one of two opposite ends of the bone shaft and a second knuckle on another of the two opposite ends, the apparatus comprising:
    a first meat stripper jaw for receiving the bone shaft of the animal part between the first knuckle and the sleeve of meat;
    a knuckle gripper for engaging between the first meat stripper and the first knuckle of the animal part;
    a cam track configured for moving apart the first meat stripper jaw and the knuckle gripper;

a meat cutter for cutting the sleeve of meat circumferentially around the second knuckle;

a mechanism for advancing and retracting the meat cutter toward the meat stripper from a direction opposite of the knuckle gripper;

a mechanism for rotating the meat cutter; and a mechanism for collecting a gathered sleeve of meat from the first meat stripper jaw and for discarding the bone.

9. The apparatus according to claim 8, and further comprising a second meat stripper jaw for engaging around the bone shaft with the second meat stripper jaw complimenting the first meat stripper jaw and configured for movement between an open and a closed position.

10. The apparatus according to claim 9 and further comprising a pivoting meat stripper arm to a free end of which the second meat stripper jaw is mounted and a trunnion block to which the meat stripper arm is pivotally mounted for movement between an open position and a closed position, and a spring yieldably biasing the meat stripper arm to its open position.

11. The apparatus according to claim 10 and further comprising a ramp and wherein the second meat stripper jaw is moved to the closed position by engaging the ramp.

12. The apparatus according to claim 11 and further comprising first and second knuckle gripper carriers and wherein the knuckle gripper for engaging between the first meat stripper jaw and the first knuckle of the animal part is mounted on the first and second knuckle gripper carriers.

13. The apparatus according to claim 12, wherein the cam track comprises a stationary cam track drum including first and second cam tracks formed on its surface for operating engagement and disengagement of the knuckle gripper and a third cam track for advancing and retracting the meat cutter.

14. The apparatus according to claim 13, wherein the meat cutter has a circumferential cutting edge on one end of a tubular body and is arranged to be rotatably driven by a gear pinion arranged on an opposite end thereof.

15. The apparatus according to claim 14, wherein the mechanism for rotating the meat cutter comprises a stationary arranged toothed segment.

16. The apparatus according to claim 15 and further comprising an endless conveyor and wherein the first meat stripper jaw is part of the endless conveyor.

17. The apparatus according to claim 16, wherein the endless conveyor is arranged for movement in a path that at least partly coincides with the cam track.

18. The apparatus according to claim 17, wherein the knuckle gripper and the meat cutter are arranged on a module that is mounted for rotation about the stationary cam track drum.

19. The apparatus according to claim 18 and further comprising a stationary cutter and wherein the path of the endless conveyor, prior to coinciding with the stationary cam track drum, passes the stationary cutter for at least partially cutting the sleeve of meat from the bone adjacent to the first knuckle of the animal part to be engaged by the first meat stripper jaw.

20. A method of removing a sleeve of meat from a bone having a first knuckle on one of two opposite ends of a shaft of the bone and a second knuckle on another of the two opposite ends, the method comprising the steps of:

(a) stripping the sleeve of meat from the bone progressively toward the second knuckle to gather the sleeve of meat about the second knuckle;

(b) cutting the sleeve of meat in a pattern that surrounds the second knuckle to free the meat substantially from the second knuckle;

(c) collecting the meat; and (d) discarding the bone.

21. The method of claim 20 and wherein step (a) comprises confining the shaft of the bone with a meat stripper at a location between the sleeve of meat and the first knuckle and relatively moving the bone and meat stripper to advance the meat stripper and the second knuckle toward one another.

22. The method of claim 21 and wherein the step of relatively moving comprises moving the bone relative to the meat stripper.

23. The method of claim 22 and wherein the step of moving the bone comprises gripping the bone adjacent the first knuckle and pulling the bone away from the meat stripper.

24. The method of claim 20 and wherein step (b) comprises advancing a meat cutter through the sleeve of meat around the second knuckle.

25. The method of claim 24 and wherein the meat cutter is tubular with a substantially circumferential cutting edge on one end and wherein advancing the meat cutter comprises advancing the one end of the meat cutter through the sleeve of meat.

26. The method of claim 25 and further comprising rotating the meat cutter as it advances through the sleeve of meat.

27. An apparatus for removing a sleeve of meat from a bone having a first knuckle on one of two opposite ends of a shaft of the bone and a second knuckle on another of the two opposite ends, the apparatus comprising:

a meat stripper configured to receive and confine the shaft of the bone at a position between the sleeve of meat and the first knuckle;

a knuckle gripper configured to engage the bone at a position between the meat stripper and the first knuckle;

a mechanism for moving the knuckle gripper away from the meat stripper to strip the sleeve of meat from the shaft of the bone progressively toward the second knuckle an thereby gather the meat about the second knuckle;

a meat cutter configured to cut the meat in a pattern that substantially surrounds the second knuckle to free the meat substantially from the bone; and a mechanism for removing the bone from the meat and collecting the meat.

28. The apparatus of claim 27 and wherein the mechanism for moving the knuckle gripper away from the meat stripper comprises a cam track and a guide roller coupled to the knuckle gripper and riding in the cam track, the knuckle gripper movable relative to the cam track and the cam track configured to move the guide roller and the knuckle gripper away from the meat stripper.

29. The apparatus of claim 27 and wherein the meat cutter comprises a tubular body having a substantially circumferential cutting edge at one end and a mechanism for advancing the cutting edge of the meat cutter through the meat.

30. The apparatus of claim 29 and further comprising a mechanism for rotating the tubular body of the meat cutter as the circumferential cutting edge is advanced through the meat.

31. The apparatus of claim 30 and wherein the mechanism for rotating comprises a pinion on the tubular body and a toothed rack engageable with the pinion to rotate the tubular body.

* * * * *